United States Patent Office.

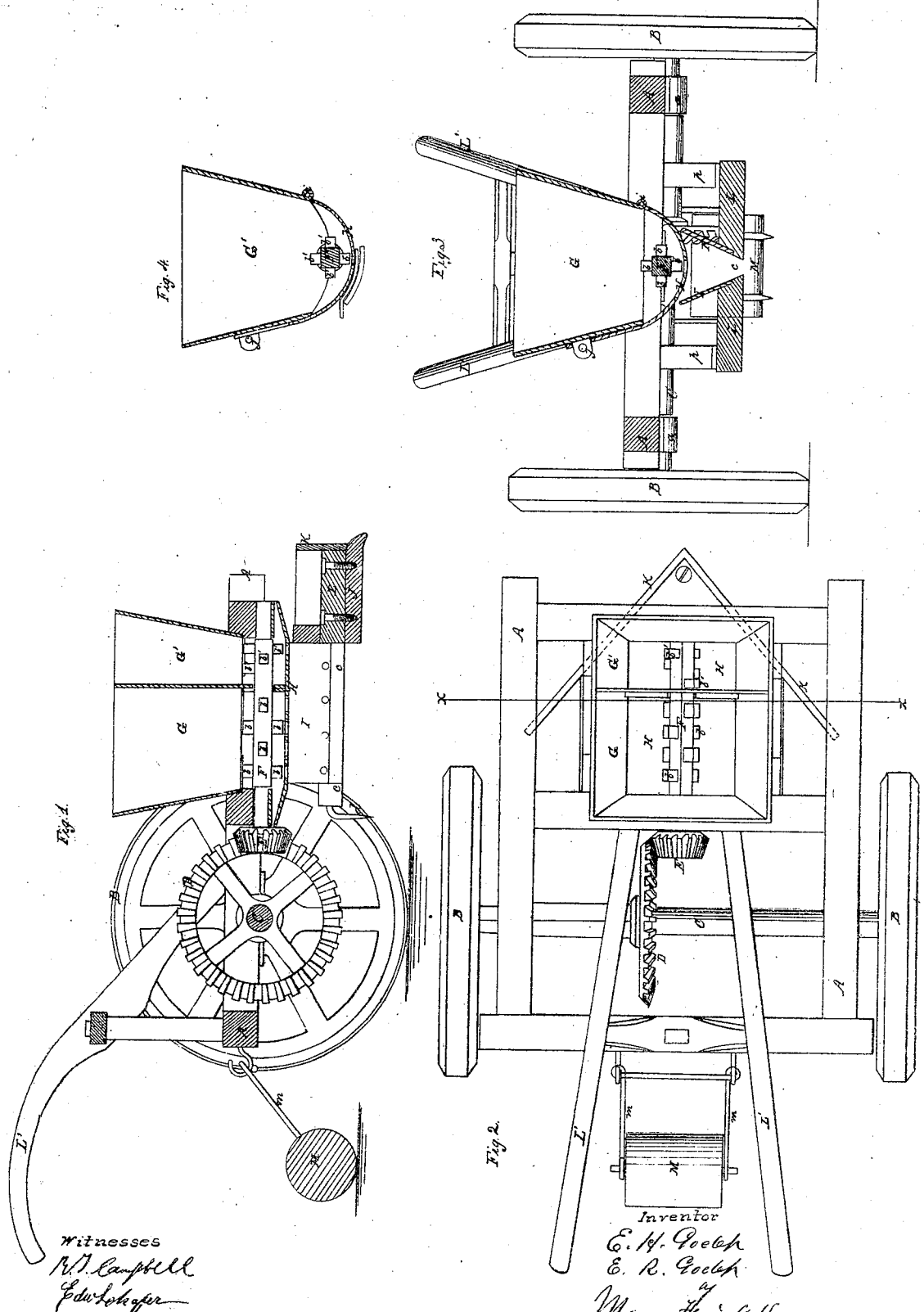

E. H. GOELET AND E. B. GOELET, OF GOLDSBOROUGH, NORTH CAROLINA.

*Letters Patent No. 71,295, dated November 26, 1867.*

IMPROVEMENT IN SEEDING-MACHINE.

*The Schedule referred to in these Letters Patent and making part of the same.*

TO ALL WHOM IT MAY CONCERN:

Be it known that we, E. H. GOELET and E. B. GOELET, of Goldsborough, in the county of Wayne, and State of North Carolina, have invented a Machine for Sowing Cotton-Seed and Guano; and we do hereby declare that the following is a full, clear, and exact description thereof, reference being had to the accompanying drawings, making part of this specification, in which—

Figure 1 is a longitudinal section taken in a vertical plane through the centre of the improved machine.

Figure 2 is a top view of the improved machine complete.

Figure 3 is a transverse section taken through the machine in the vertical plane indicated by red line $x$ in fig. 2.

Figure 4 is a transverse vertical section through the hopper, from which the guano is distributed.

Similar letters of reference indicate corresponding parts in the several figures.

This invention relates to certain novel improvements on that class of seeding-machines which are particularly designed for sowing cotton-seed, and at the same time distributing guano or other fertilizer with the seed.

The nature of our invention consists in a scraper and opener, for scraping off the tops of the ridges, and making drills or furrows for receiving the seed and fertilizer, a guano-distributor, a seed-distributor, a covering device, and a roller, all of which are so arranged and applied to a carriage having two transporting, driving, and marking-wheels, that the fertilizer and cotton-seed can be sown in drills at regular intervals apart, and prevented from being blown about and wasted by the wind, as will be hereinafter described.

To enable others skilled in the art to understand our invention, we will describe its construction and operation.

In the accompanying drawings, A represents a rectangular frame, which is mounted upon two transporting-wheels B B, applied fast upon an axle, C. This axle turns freely in boxes $a\ a$, which are bolted fast to the lower side of the frame A, and has keyed upon it a large bevel-wheel, D, as shown in figs. 1 and 2. The tires on the two wheels B B are made with bevelled sides, so that these wheels will sink into the surface of the ground passed over, and thus leave tracks or marks by which the machine can be guided, after making one passage across the field, and the seed and fertilizer sowed in straight lines, and in drills which are at equal distances apart. The large wheels B are in this manner made to serve the threefold purpose of transporting-wheels, drivers, and markers. The large bevel-wheel on the axle C engages with the teeth of a pinion-wheel, E, on the rear end of a longitudinal shaft, F, and rotates this shaft when the machine is moved along. Shaft F is arranged within two hoppers G G', or one hopper divided as shown, and this shaft is in the middle of the width of the frame A, supported at its extremities in boxes, which are bolted to the bottom side of the said frame, as shown in figs. 1 and 3. The hopper-box is secured between two transverse beams of frame A, and provided with a concave bottom, H, which, like the hopper-box, is divided so as to leave an apartment, G, for cotton-seed, and an apartment, G', in front of this for guano or other fertilizer. This bottom is hinged at $i$, and secured by a hasp and staple at $j$, as shown in fig. 3. Holes are made through the centre of the hinged bottom H for the discharge of the fertilizer and cotton-seed, which is effected by means of studs or projections $b\ b'$, on the shaft F. The hole or holes through that portion of the hinged bottom H which extends beneath the apartment G' are provided with movable gates or slides, for the purpose of regulating the discharge of the fertilizer according to the quantity which it is desired to sow to the acre. Beneath the front part of the frame A, a platform, L, is hung by strong brackets $p\ p$, and through the centre of this platform a slot, $c$, is made, directly beneath the holes through which the seed and fertilizer escape from the hopper. On the sides of this slot or oblong space $c$, inclined guards I I are secured, which extend up nearly to the hopper-bottom, and form guides for conducting the fertilizer and seed through the space $c$ into the drill below. The platform L terminates at its front edge in two scrapers $k\ k$, which slope from an acute angle which is in the centre of the machine, backward in oblique lines, and which rise from the bottom of the platform some distance above it, as shown in figs. 1 and 2. These sloping boards and the bottom of the platform are designed for scraping and smoothing the tops of the ridges, preparatory to opening the furrows or drills. J represents a tooth, which is secured to the bottom of the platform L, in front of and in a vertical plane with the slot $c$, for the purpose of forming the drills in which to sow the seed and fertilizer. To the rear end of the platform L, and on both sides of the slot $c$, spurs $a\ a$ are secured, which project downward, and serve to loosen the earth, and throw some of it over the seed. Then follows the cylindrical roller M, which is hinged to the rear end of frame A by arms *m*, and presses down the earth over the seed, and breaks up any clods of earth which may lie in its path.

The machine is to be drawn by two horses, and guided by a person walking behind it, who grasps the two handles or stilts L'. In practice we shall have the wheels B upon axle C applied so that they can be set further apart or adjusted nearer together, according to the width of the rows desired. Set-screws may be applied on the hubs of said wheels for this purpose.

Having described our invention, what we claim as new, and desire to secure by Letters Patent, is—

1. The construction of the scraper and leveller K L with slot *c*, tooth J, and covering-teeth *d d*, arranged beneath a hopper-box, having apartments G G', rotary distributors *b b'*, and hinged bottom H, substantially as described.

2. The scraper K L, with its tooth J, and coverers *d d*, slot *c*, and inclined guards I I, arranged beneath a cotton-seed and a guano-distributor, so as to operate substantially as described.

3. The application of a drill-opener, a scraper and leveller, a cotton-seed distributor, a coverer, and a roller, to a frame A, which is mounted upon two wheels, when these wheels serve as drivers and markers, substantially as described.

E. H. GOELET,
E. B. GOELET.

Witnesses:
    E. R. Cox,
    B. B. Raiford.